United States Patent
Bouwmeester et al.

(10) Patent No.: US 6,823,939 B2
(45) Date of Patent: Nov. 30, 2004

(54) METHODS OF TREATING SUBTERRANEAN ZONES PENETRATED BY WELL BORES

(75) Inventors: Ron Bouwmeester, Oude Wetering (NL); Cornelis Wouter Botermans, Utrecht (NL)

(73) Assignee: Halliburton Energy Services, Inc., Duncan, OK (US)

( * ) Notice: Subject to any disclaimer, the term of this patent is extended or adjusted under 35 U.S.C. 154(b) by 47 days.

(21) Appl. No.: 10/146,203

(22) Filed: May 15, 2002

(65) Prior Publication Data

US 2003/0213593 A1 Nov. 20, 2003

(51) Int. Cl.⁷ .................... E21B 43/22; E21B 33/138
(52) U.S. Cl. .................. 166/270; 166/292; 166/294; 166/295; 166/28.5; 507/215; 507/216; 507/903
(58) Field of Search ................... 166/292, 294, 166/295, 270, 285, 293, 305.1; 507/209, 210, 213–216, 224, 271, 293, 903

(56) References Cited

U.S. PATENT DOCUMENTS

| | | | | |
|---|---|---|---|---|
| 3,985,659 A | * | 10/1976 | Felicetta et al. | 507/108 |
| 4,463,808 A | * | 8/1984 | Mason et al. | 166/292 |
| 4,524,829 A | | 6/1985 | Hanlon et al. | 166/294 |
| 4,631,091 A | * | 12/1986 | Goodman | 106/468 |
| 4,742,098 A | | 5/1988 | Finlayson et al. | 523/514 |
| 4,888,120 A | | 12/1989 | Mueller et al. | 252/8.551 |
| 5,067,565 A | | 11/1991 | Holtmyer et al. | 166/305.1 |
| 5,099,923 A | * | 3/1992 | Aften et al. | 166/294 |
| 5,335,726 A | | 8/1994 | Rodrigues | 166/295 |
| 5,358,051 A | | 10/1994 | Rodrigues | 166/295 |
| 5,413,178 A | | 5/1995 | Walker et al. | 166/300 |
| 5,816,323 A | * | 10/1998 | Sydansk | 166/295 |
| 5,827,804 A | * | 10/1998 | Harris et al. | 507/273 |
| 5,849,674 A | * | 12/1998 | Fox et al. | 507/140 |
| 5,913,364 A | * | 6/1999 | Sweatman | 166/281 |
| 5,944,106 A | * | 8/1999 | Dalrymple et al. | 166/281 |
| 5,989,336 A | * | 11/1999 | Carpenter et al. | 106/811 |
| 6,016,879 A | * | 1/2000 | Burts, Jr. | 175/72 |
| 6,024,170 A | * | 2/2000 | McCabe et al. | 166/300 |
| 6,089,318 A | * | 7/2000 | Laramay et al. | 166/293 |
| 6,102,121 A | * | 8/2000 | Burts, Jr. | 166/295 |
| 6,143,699 A | * | 11/2000 | Zhou | 507/276 |
| 6,165,947 A | * | 12/2000 | Chang et al. | 507/216 |
| 6,167,967 B1 | * | 1/2001 | Sweatman | 166/281 |
| 6,177,483 B1 | | 1/2001 | Tehrani et al. | 523/130 |
| 6,187,839 B1 | * | 2/2001 | Eoff et al. | 523/130 |
| 6,196,317 B1 | | 3/2001 | Hardy | 166/295 |
| 6,251,838 B1 | * | 6/2001 | Moorhouse et al. | 507/273 |
| 6,279,655 B1 | * | 8/2001 | Pafitis et al. | 166/294 |
| 6,364,020 B1 | * | 4/2002 | Crawshaw et al. | 166/300 |
| 6,401,819 B1 | * | 6/2002 | Harris et al. | 166/300 |
| 6,450,260 B1 | * | 9/2002 | James et al. | 166/277 |
| 6,475,959 B1 | * | 11/2002 | Lange et al. | 507/140 |
| 2002/0022678 A1 | * | 2/2002 | Lan et al. | 523/202 |

FOREIGN PATENT DOCUMENTS

| | | | |
|---|---|---|---|
| JP | 405247435 A * | 9/1993 | ............ C09K/3/00 |
| WO | WO 96/20899 | 7/1996 | ............ E21B/33/13 |

OTHER PUBLICATIONS

Rockwood Additives Ltd., Laponite Technical Bulletin brochure L204/01g, "Laponite Technical Information" from www.laponite.com, available since at least 2000 per laponite Customer Service, 12 pages.*

Rockwood Additives Ltd., "Rockwood CommuniCLAY", vol. 1 issue 3, from www.laponite.com, Jun. 21, 2001, 2 pages.*

* cited by examiner

*Primary Examiner*—David Bagnell
*Assistant Examiner*—Katherine Mitchell
(74) *Attorney, Agent, or Firm*—Robert A. Kent; C. Clark Dougherty, Jr.

(57) ABSTRACT

Methods of treating subterranean zones penetrated by well bores wherein the static temperatures of the zones are as high as 400° F. and greater include using aqueous treating fluids comprised of an aqueous liquid containing one or more inorganic monovalent salts, multivalent salts or both in an amount no greater than about 5% by weight of the aqueous liquid and one or more specific synthetic hectorite clay gelling and thixotropy imparting agents.

43 Claims, 1 Drawing Sheet

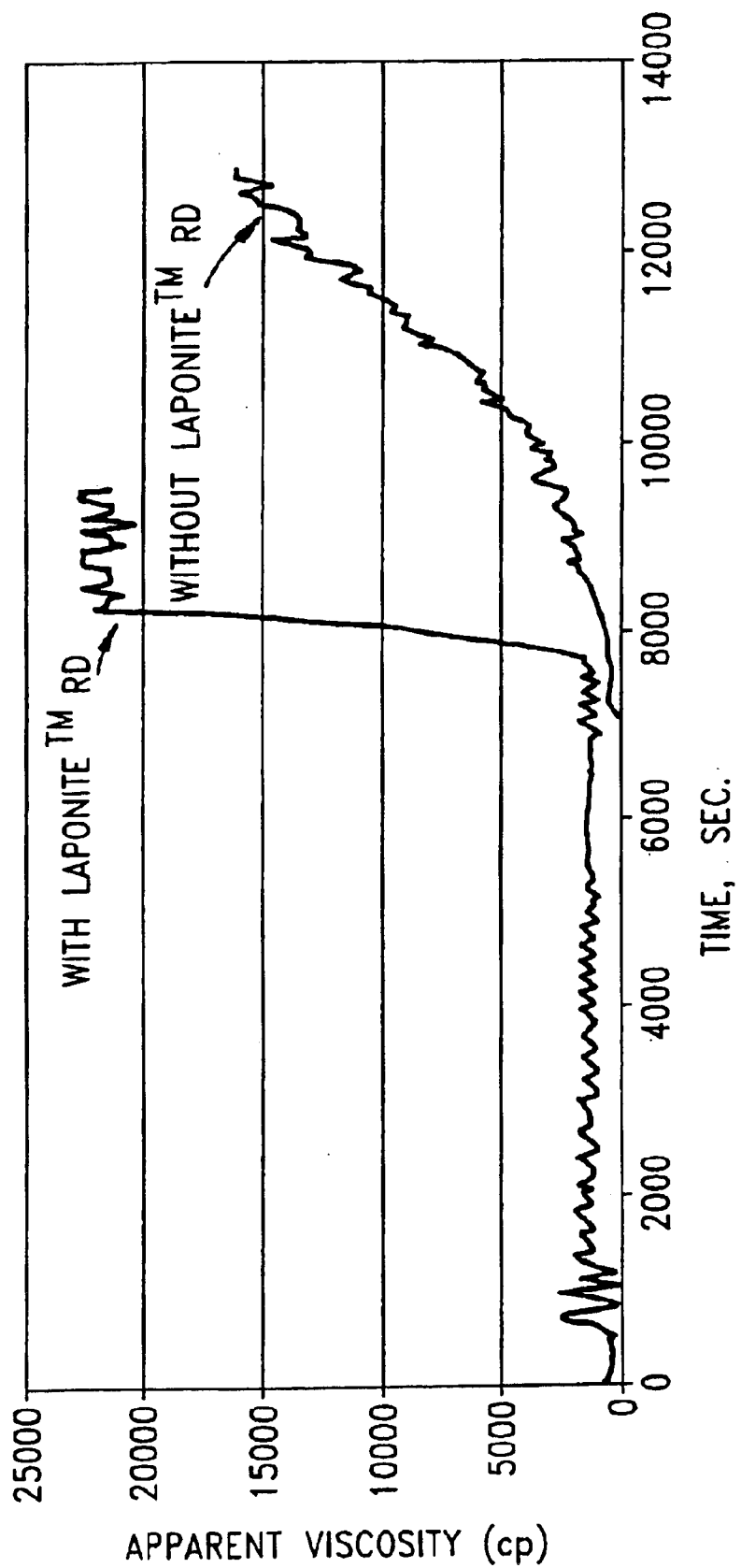

METHODS OF TREATING SUBTERRANEAN ZONES PENETRATED BY WELL BORES

BACKGROUND OF THE INVENTION

1. Field of the Invention

The present invention relates to methods of treating subterranean zones in formations penetrated by well bores with viscosified and thixotropic aqueous treating fluids.

2. Description of the Prior Art

Viscous treating fluids are used in a variety of operations and treatments in oil and gas wells. Such operations and treatments include formation permeability conformance control treatments, treatments to reduce undesirable well bore fluid inflows and outflows and others.

An example of a formation permeability conformance control treatment involves enhanced recovery techniques such as water flooding. In water flooding, an aqueous displacement fluid is injected under pressure into an oil containing subterranean formation by way of one or more injection wells. The flow of the aqueous fluid through the formation displaces oil contained therein and drives it to one or more producing wells. However, the aqueous displacement fluid often flows through the most permeable zones in the subterranean formation whereby less permeable zones containing oil are bypassed.

Heretofore, enhanced recovery problems have been corrected by reducing the permeability of the subterranean flow paths having high permeability and low oil content. As a result, the subsequently injected aqueous displacement fluid is forced through flow paths of low permeability and high oil content. The techniques utilized to accomplish the high flow path permeability reduction have included injecting aqueous solutions of polymers into the high permeability flow paths whereby the polymers are gelled and cross-linked therein.

An example of a treatment to reduce undesirable well bore fluid inflows and outflows involves the production of oil from oil-bearing formations containing highly permeable water channels communicating the well with water zones whereby water flows into the well. Heretofore, polymerizable monomers, cross-linking agents and delayed polymerization initiators have been introduced into the water channels wherein the monomers are polymerized and cross-linked so that the water channels are plugged.

For viscous well treating fluids to function properly, the fluids must remain viscous until the desired well operation or treatment has been completed. Often, however, prolonged exposure of a viscous well treating fluid to high temperatures encountered in a well causes the fluid to prematurely degrade and lose its viscosity. Many viscous treating fluids utilized heretofore lose significant viscosity in a few hours at the temperatures experienced down hole, usually at temperatures above about 300° F. Preferably, when required, a viscous well treating fluid should retain viscosity for up to 12 hours at temperatures from about ambient up to and including 400° F.

Thixotropy imparting agents have heretofore been utilized in highly viscous well treating fluids. Thixotropy imparting additives give the highly viscous treating fluids the ability to lose viscosity when being sheared such as by pumping and to return to the highly viscous gelled form when at rest. A highly viscous treating fluid having thixotropic properties allows the fluid to be readily pumped to and placed in a subterranean zone and then regain its highly viscous properties after placement. While various thixotropy imparting additives have heretofore been known and used in the art, such additives have been substantially ineffective in subterranean zones having temperatures greater than about 250° F.

Thus, there are needs for improved methods of treating subterranean zones penetrated by well bores with high viscosity treating fluids that have thixotropic properties and retain their high viscosity at subterranean zone temperatures from about 250° F. up to and including 400° F.

SUMMARY OF THE INVENTION

The present invention provides improved methods of treating subterranean zones penetrated by well bores, the subterranean zones having static temperatures from about ambient up to and including 400° F. The methods are basically comprised of introducing into a subterranean zone by way of a well bore, an aqueous treating fluid comprised of an aqueous liquid containing one or more inorganic monovalent salts, multivalent salts or both in an amount no greater than about 5% by weight of the aqueous liquid and one or more synthetic hectorite clay gelling and thixotropy imparting agents selected from the group of a synthetic hectorite clay having the composition by weight on a dry basis of 59.5% $SiO_2$, 27.5% MgO, 0.8% $Li_2O$ and 2.8% $Na_2O$, a synthetic hectorite clay having the composition by weight on a dry basis of 54.5% $SiO_2$, 26.0% MgO, 0.8% $Li_2O$, 5.6% $Na_2O$ and 4.1% $P_2O_5$ and a synthetic hectorite clay having the composition by weight on a dry basis of 54.5% $SiO_2$, 26.0% MGO, 0.8% $LiO_2$, 5.6% $Na_2O$, 4.1% $P_2O_5$ and also containing inorganic polyphosphate peptizers.

When one or more of the gelling and thixotropy imparting agents of this invention are added to an aqueous treating fluid, the viscosity of the fluid is increased and the fluid has thixotropic properties whereby the viscosity of the aqueous treating fluid is reduced during pumping and placement in a subterranean zone, but regains a high viscosity when static. In order to stabilize the viscosity during pumping a separate viscosity stabilizing gelling agent can be included in the treating fluid. Examples of commonly used gelling agents include galactomannans, modified or derivatized galactomannans and cellulose derivatives. Cross-linking agents, breakers and other additives can also be included in the viscous well treating fluids useful in accordance with this invention.

Subterranean formation permeability conformance control treatments are also provided by the present invention. Such methods are basically comprised of altering the permeability of the subterranean formation by contacting the subterranean formation with an aqueous treating liquid containing one or more inorganic monovalent salts, multivalent salts or both in an amount no greater than about 5% by weight of the aqueous liquid and one or more synthetic hectorite clay gelling and thixotropy imparting agents selected from the group set forth above. The aqueous treating liquid can also include separate gelling agents of the types mentioned above, cross-linking agents and other additives. A particularly suitable separate gelling agent which can be used is a water dispersible hydrophilic organic polymer having a molecular weight greater than 100,000 and containing carboxyl functionality and a zirconium cross-linking composition. Another particularly suitable separate gelling agent which can be used is a chelated organic gelling agent comprised of a metal ion chelated water soluble polyalkaline imine and a water soluble polymer capable of being cross-linked by the chelated organic gelling agent. The metal ion chelated water soluble polyalkaline imine can be selected from polyethylene imine or polypropylene imine and the water soluble polymer capable of being cross-linked by the chelated organic gelling agent is a terpolymer of an ethylenically unsaturated polar monomer, an ethylenically unsaturated ester and a monomer selected from the group consisting of 2-acrylamido-2-methylpropane sulfonic acid (AMPS®) or N-vinylpyrrolidone or the water soluble polymer is a tetrapolymer of an ethylenically unsaturated polar monomer, an ethylenically unsaturated ester, AMPS® and N-vinylpyrrolidone.

Treatments to reduce undesirable well bore fluid inflows and outflows from a subterranean zone are also provided by this invention. Such methods are basically comprised of the following steps. An aqueous treating fluid is placed in the subterranean zone which contains one or more inorganic monovalent salts, multivalent salts or both in an amount no greater than about 5% by weight of the aqueous treating fluid and one or more synthetic hectorite clay gelling and thixotropy imparting agents selected from the group set forth above. The aqueous treating fluid also includes a separate gelling agent of the type mentioned above, cross-linking agents and other additives. After the subterranean zone is contacted, the aqueous treating fluid is allowed to remain in the subterranean zone at rest for a time within which the gelling agents therein form a solidified sealing mass in the subterranean zone. A particularly suitable separate gelling agent which can be used is a polymerizable water soluble vinyl monomer and a multifunctional vinyl monomer crosslinker together with a water soluble azo initiator.

It is, therefore, a general object of the present invention to provide improved methods of treating subterranean zones in formations penetrated by well bores.

Other and further objects, features and advantages of the present invention will be readily apparent to those skilled in the art upon a reading of the description of preferred embodiments which follows when taken in conjunction with the accompanying drawing.

BRIEF DESCRIPTION OF THE DRAWING

The drawing is a graph of apparent viscosity versus time for gelled water with and without "LAPONITE™ RD".

DESCRIPTION OF PREFERRED EMBODIMENTS

The present invention provides improved methods of treating subterranean zones penetrated by well bores where the subterranean zones have temperatures in the range of from about ambient up to and including 400° F. The methods utilize an aqueous treating fluid basically comprised of an aqueous liquid containing one or more inorganic monovalent salts, multivalent salts or both in an amount no greater than about 5% by weight of the aqueous liquid, and an effective amount of one or more synthetic hectorite clay gelling and thixotropy imparting agents.

A preferred synthetic hectorite clay for use in accordance with this invention is commercially available from Laporte Absorbents Company of Cheshire, United Kingdom under the trade designation "LAPONITE™ RD" which is a free flowing synthetic hectorite clay having the composition by weight on a dry basis of 59.5% $SiO_2$, 27.5% MgO, 0.8% $Li_2O$ and 2.8% $Na_2O$. Loss on ignition and other losses is 9.4%.

Another preferred synthetic hectorite clay that is commercially available from Laporte under the trade designation "LAPONITE™ RDS" has a composition by weight on a dry basis of 54.5% $SiO_2$, 26.0% MgO, 0.8% $Li_2O$, 5.6% $Na_2O$ and 4.1% $P_2O_5$. Loss on ignition and other losses is 9.0%.

Still another preferred synthetic hectorite clay is commercially available from Laporte under the trade designation "LAPONITE™ JS" which has the same composition as "LAPONITE™ RDS," but incorporates inorganic polyphosphate peptizers.

The above described gelling and thixotropy imparting agents provide stable viscosity to an aqueous treating fluid when at rest at the high temperatures mentioned above as well as thixotropic properties whereby the viscosity of the treating fluid is reduced during pumping but returns when the treating fluid is static. The gelling and thixotropy imparting agents are in the form of free-flowing powders which are easily dispersed in water. Also, the agents are fine grained with an average particle size of less than one micron.

The aqueous treating fluid employed in the practice of this invention may be substantially any aqueous fluid including fresh water that contains a relatively small amount of inorganic monovalent salts, multivalent salts or both. That is, the water must contain at least a small amount of one or more salts, but not more than an amount of about 5% by weight of the aqueous liquid. The presence of the small amount of salt or salts in the water is necessary for the synthetic hectorite clay gelling and thixotropy imparting agent to form a gel in the aqueous liquid and impart thixotropic properties thereto.

As mentioned, the synthetic hectorite clay gelling and thixotropy imparting agents described above provide viscosity and thixotropic properties to an aqueous treating fluid of this invention at temperatures in the range of from about ambient up to and including 400° F. One or more of the synthetic hectorite clay gelling and thixotropy imparting agents are included in the aqueous treating fluid in an amount in the range of from about 0.1% to about 10% by weight of the aqueous treating fluid, more preferably in an amount from about 0.5% to about 5%.

In order to provide stability to the viscosity of the aqueous treating fluid when it contains suspended solids and is sheared by pumping or the like, one or more separate gelling agents can be included in the aqueous treating fluid. A variety of gelling agents can be used including natural and derivatized polysaccharides which are soluble, dispersible or swellable in an aqueous liquid to yield viscosity to the liquid. One group, for example, of polysaccharides which are suitable for use in accordance with the present invention includes galactomannan gums such as gum arabic, gum gahtti, gum karaya, tamarind gum, tragacanth gum, guar gum, locust bean gum and the like. The gums can also be characterized as having one or more functional groups such as cis-hydroxyl, hydroxyl, carboxyl sulfate, sulfonate, amino or amide. Modified gums such as carboxyalkyl derivatives, like carboxymethylguar and hydroxyalkyl derivatives, like hydroxypropylguar can also be employed. Doubly derivatized gums such as carboxymethylhydroxypropylguar can also be used.

Modified celluloses and derivatives thereof can also be employed as separate gelling agents in accordance with the present invention. Examples of water-soluble cellulose ethers which can be used include, but are not limited to, carboxyethyl cellulose, carboxymethyl cellulose, carboxymethylhydroxyethyl cellulose, hydroxyethyl cellulose, hydroxypropyl cellulose, methylhydroxypropyl cellulose, methyl cellulose, ethyl cellulose, propyl cellulose, ethylcarboxymethyl cellulose, methylethyl cellulose, hydroxypropylmethyl cellulose and the like. A particularly suitable derivatized cellulose is hydroxyethyl cellulose grafted with vinyl phosphonic acid as disclosed in U.S. Pat. No. 5,067,565 issued on Nov. 26, 1991 to Holtmyer et al., the disclosure of which is incorporated herein by reference.

Of the galactomannans and derivative galactomannans, guar, hydroxypropylguar and carboxymethylhydroxypropylguar are preferred. Of the cellulose derivatives, hydroxyethyl cellulose, carboxymethylhydroxyethyl cellulose, carboxymethyl cellulose and hydroxyethyl cellulose grafted with vinyl phosphonic acid are preferred. When used, the gelling agent is included in the aqueous treating fluid in an amount in the range of from about 0.1% to about 2% by weight of the treating fluid.

In order to further enhance the development of the viscosity of the aqueous treating fluid containing the above polysaccharide gelling agents, the gelling agents can be cross-linked by the addition of a cross-linking agent to the aqueous treating fluid. The cross-linking agent can comprise a borate releasing compound or any of the well known transition metal ions which are capable of creating a cross-linked structure with the particular gelling agent utilized. Preferred cross-linking agents for use with the above described separate gelling agents include, but are not limited to, borate releasing compounds, a source of titanium ions, a source of zirconium ions, a source of antimony ions and a source of aluminum ions. When used, a cross-linking agent of the above types is included in the aqueous treating fluid in an amount in the range of from about 0.01% to about 5% by weight of the gelling agent therein.

Other separate gelling agents which can be used include, but are not limited to, biopolymers such as xanthan, scleroglucan and succinoglucan and water dispersible hydrophillic organic polymers having a molecular weight greater than 100,000 such as polyacrylamide and polymethacrylamide wherein about 5% to about 75% of the carboxamides are hydrolyzed to carboxyl groups, cellulose ethers, and a copolymer of about 5% to about 70% by weight acrylic acid or methacrylic acid copolymerized with acrylamide or methacrylamide. The foregoing water dispersible organic hydrophilic polymers can be cross-linked with a cross-linking composition comprising water, a zirconium compound having a value of 4+, an alpha-hydroxy acid and an amine compound as more fully described in U.S. Pat. No. 4,524,829 issued to Hanlon et al. on Jun. 25, 1985 which is incorporated herein by reference.

Still other separate gelling agents which can be used include, but are not limited to, a chelated organic gelling agent comprised of a metal ion chelated with a water soluble polyalkylene imine, such as polyethylene or polypropylene imine, and a water soluble polymer capable of being cross-linked by the chelated gelling agent. Such polymers capable of being cross-linked by the chelated gelling agent include: (a) a terpolymer of an ethylenically unsaturated polar monomer, an ethylenically unsaturated ester and a monomer selected from 2-acrylamido-2-methyl propane sulfonic acid (AMPS®) or N-vinylpyrrolidone, and (b) a tetrapolymer of an ethylenically unsaturated polar monomer, an ethylenically unsaturated ester, AMPS® and N-vinylpyrrolidone as more fully described in U.S. Pat. No. 6,196,317 B1 issued to Hardy on Mar. 6, 2001, which is incorporated herein by reference.

Yet other separate gelling agents that can be used include polymerizable water soluble monomers selected from acrylic acid, hydroxyethylacrylate, methacrylic acid, acrylamide, methacrylamide, 2-methacrylamido-2-methyl propane sulfonic acid, AMPS®, N,N-dimethyl acrylamide, vinyl sulfonic acid, N,N-dimethylaminoethylmethacrylate, 2-triethylammoniumethylmethacrylate chloride, N,N-dimethylaminopropylmethacrylamide, methacrylamidopropyl trimethylammonium chloride, N-vinyl pyrrolidone, vinyl phosphonic acid and methacryloyloxyethyl trimethylammonium sulfate. The above polymerizable monomers can be polymerized by initiators including 2,2'-Azobis(N, N'-dimethylene isobutylamidine) dihydrochloride, 2,2'-Azobis(amidinopropane) dihydrochloride and 2,2'-Azobis [2-methyl-N-(2-hydroxyethyl) propionamide]. The polymerized monomers can be cross-linked with a cross-linker selected from glycerol dimethacrylate, glycerol diacrylate and others more fully described in U.S. Pat. No. 5,335,726 issued to Rodrigues on Aug. 9, 1994 which is incorporated herein by reference.

In order to recover a gelled aqueous treating fluid of this invention from a subterranean zone, the aqueous treating fluid containing an aqueous liquid and an above described synthetic hectorite clay gelling and thixotropy imparting agent is contacted with an aqueous salt solution. That is, the aqueous treating fluid is contacted with an aqueous salt solution that has a salinity that is greater than the original solution containing the thixotropy imparting agent. When the higher concentration salt solution contacts the aqueous treating solution, the synthetic hectorite clay gelling and thixotropy imparting agent loses its gelling ability and a reduction in the viscosity of the aqueous treating fluid takes place whereby the treating fluid can be back-flowed and recovered from the formation.

A conformance control method of the present invention for altering the permeability of a subterranean formation penetrated by a well bore is comprised of contacting the subterranean formation with an aqueous treating liquid containing one or more inorganic monovalent salts, multivalent salts or both in an amount no greater than about 5% by weight of the aqueous liquid and one or more synthetic hectorite clay gelling and thixotropy imparting agents selected from the group of a synthetic hectorite clay having a composition by weight on a dry basis of 59.5% $SiO_2$, 27.5% $MgO$, 0.8% $Li_2O$ and 2.8% $Na_2O$, a synthetic hectorite clay having a composition by weight on a dry basis of 54.5% $SiO_2$, 26.0% $MgO$, 0.8% $Li_2O$, 5.6% $Na_2O$ and 4.1% $P_2O_5$ and a synthetic hectorite clay having a composition by weight on a dry basis of 54.5% $SiO_2$, 26.0% $MgO$, 0.8% $LiO_2$, 5.6% $Na_2O$, 4.1% $P_2O_5$ which also contains inorganic phosphate peptizers.

The hectorite clay gelling and thixotropy imparting agent is present in the gelled aqueous carrier liquid in an amount in the range of from about 0.5% to about 5% by weight thereof. Also, the gelled aqueous carrier liquid can include a separate gelling agent. The separate gelling agent is usually selected from the group consisting of galactomannan gums, modified or derivatized galactomannan gums, cellulose derivatives and biopolymers such as xanthan, succinoglucan and scleroglucan. Of these, guar gum, hydroxypropylguar, hydroxyethylcellulose and xanthan are generally preferred. When the above described separate gelling agents are cross-linked, a cross-linking agent selected from one of borate releasing compounds, a source of titanium ions, a source of zirconium ions, a source of antimony ions and a source of aluminum ions are usually utilized. As previously mentioned, a particularly suitable separate gelling agent which can be used is a water dispersible hydrophilic organic polymer having carboxyl functionality and a molecular weight greater than 100,000 and a zirconium cross-linking composition. Another particularly suitable separate gelling agent which can be used is a chelated organic gelling agent comprised of a metal ion chelated water soluble polyalkaline imine and a water soluble polymer capable of being cross-linked by the chelated organic gelling agent. The metal ion chelated water soluble polyalkaline imine can be selected from polyethylene imine or polypropylene imine and the water soluble polymer capable of being cross-linked by the chelated organic gelling agent is a terpolymer of an ethylenically unsaturated polar monomer, an ethylenically unsaturated ester and a monomer selected from the group consisting of AMPS® or N-vinylpyrrolidone or the water soluble polymer is a tetrapolymer of an ethylenically unsaturated polar monomer, an ethylenically unsaturated ester, AMPS® and N-vinylpyrrolidone. When a separate gelling agent of a type described above is used, it is included in the conformance control aqueous treating liquid in an amount in the range of from about 2% to about 20% by weight of the aqueous treating liquid, and the cross-linking agent is present in the gelled aqueous treating liquid in an amount in the range of from about 0.01% to about 5% by weight thereof.

A method of this invention for reducing undesirable well bore inflows and outflows from a subterranean zone penetrated by a well bore is comprised of placing an aqueous treating fluid in the subterranean zone which contains one or more inorganic monovalent salts, multivalent salts or both in an amount no greater than about 5% by weight of the aqueous treating fluid and one or more synthetic hectorite clay gelling and thixotropy imparting agents selected from the group of a synthetic hectorite clay having a composition by weight on a dry basis of 59.5% $SiO_2$, 27.5% MgO, 0.8% $Li_2O$ and 2.8% $Na_2O$, a synthetic hectorite clay having a composition by weight on a dry basis of 54.5% $SiO_2$, 26.0% MgO, 0.8% $Li_2O$, 5.6% $Na_2O$ and 4.1% $P_2O_5$ and a synthetic hectorite clay having a composition by weight on a dry basis of 54.5% $SiO_2$, 26.0% MgO, 0.8% $LiO_2$, 5.6% $Na_2O$, 4.1% $P_2O_5$ which also contains inorganic polyphosphate peptizers. A separate gelling agent is usually included in the aqueous treating fluid selected from the group consisting of galactomannan gums, modified or derivatized galactomannan gums, cellulose derivatives and biopolymers such as xanthan, succinoglucan and scleroglucan and a cross-linking agent selected from one of borate releasing compounds, a source of titanium ions, a source of zirconium ions, a source of antimony ions and a source of aluminum ions. A particularly suitable separate gelling agent which can be utilized is comprised of at least one polymerizable water soluble vinyl monomer, at least one multifunctional vinyl monomer cross-linker and a water soluble azo initiator.

The hectorite clay gelling and thixotropy imparting agent is present in the aqueous treating liquid in an amount in the range of from about 0.5% to about 5% by weight thereof. The separate gelling agent is included in the gelled aqueous treating liquid in an amount in the range of from about 0.1% to about 10% by weight of the treating liquid and the cross-linking agent is present in the gelled aqueous treating liquid in an amount in the range of from about 0.01% to about 5% by weight thereof.

The treating fluids utilized in accordance with the methods described herein can also include any other conventional additives such as bactericides, clay stabilizers, surfactants or the like which do not adversely react with other components in the treating fluids.

In order to further illustrate the methods and aqueous treating fluids of the present invention, the following examples are given.

EXAMPLE 1

864 milliliters of tap water were added to a one liter Waring blender jar. The blender was set to low mixing speed and 26 milliliters (3% by volume) of synthetic hectorite clay having the composition by weight on a dry basis of 59.5% $SiO_2$, 27.5% MgO, 0.8% $Li_2O$ and 2.8% $Na_2O$ ("LAPONITE™ RD") was added to the water in the blender jar, i.e., to the side of the water vortex in the jar. The "LAPONITE™ RD" was left in the blender jar to disperse and hydrate for 20 minutes. 135 milliliters of hydroxyethylacrylate polymerizable water soluble monomer and 1 milliliter of a pH buffer were added to the fluid in the blender jar. Thereafter, 5.2 grams of 2,2'-Azobis[2-methyl-N-(2-hydroxyethyl)propionamide] were added and dissolved in the fluid. A gel time test using the fluid described above was conducted as follows. 35 milliliters of the fluid described above was transferred to a standard Fann-50 viscometer cup. A standard Fann B5X Bob was used in combination with a standard spring for viscosity measurements. After the cup was mounted on the viscometer, the fluid was quickly heated to a test temperature of 60° C. by the Fann-50 viscometer cup oil bath. The viscosity build-up at a constant shear rate of $16^{sec-1}$ was monitored continuously and recorded at time intervals of 1 minute.

The gel time test was repeated using a 35 milliliter volume of tap water containing the same amounts of hydroxyethylacrylate polymerizable water soluble monomer and 2,2'-Azobis[2-methyl-N-(2-hydroxyethyl)propionamide] initiator. The results of the test are shown in the accompanying drawing at the inflection points of the viscosity vs. time curves for gelled water with and without "LAPONITE™ RD".

The results of the test show that the addition of 3% "LAPONITE™ RD" does not significantly influence the gel times of gelled water. The gelled water with "LAPONITE™ RD" had a faster viscosity build up at the inflection point than the gelled water without "LAPONITE™ RD".

EXAMPLE 2

The mixing procedure and the chemicals used for preparing a gellable aqueous solution containing 3% "LAPONITE™ RD" described in Example 1 above was repeated.

An extrusion test of the solution containing "LAPONITE™ RD" after the solution gelled was conducted as follows. Sections of 316 stainless steel tubing were prepared and cleaned with acetone. Caps were mounted on both sides of each of the tubing sections and the caps were connected to valves. The tubing sections were each completely filled with the gellable solution containing 3% by volume "LAPONITE™ RD" and then the sections were placed in an air heated oven and left to gel for 16 hours at 80° C. Thereafter, the tubing sections were removed from the oven and cooled to 20° C. One end of each tubing section containing the gelled aqueous solution was connected to an ISCO Model 500D high pressure liquid pump connected to a reservoir of purified water. The valves on both sides of the tubing sections were opened to allow flow through the tubing sections. The flow of water was started at a low rate causing a pressure build up on the gelled solution. The pressure on the injection side of each tubing section was continuously monitored and recorded using a Honeywell differential pressure transducer. The failure pressure of each of the gelled solutions was recorded.

The tubing sections used in the above test were of different lengths and aqueous gellable solutions with and without "LAPONITE™ RD" were tested. The results of these tests are given in the Table below.

TABLE

Extrusion Pressures Of Gelled Water With And Without "LAPONITE ™ RD" In Stainless Steel Tubes

| Test No. | Quantity of "LAPONITE ™ RD" in Gellable Water, % by weight of water | Tubing Section Length, inches | Tubing Section Outside Diameter, inches | Extrusion Pressure, psi/ft. | Extrusion Pressure Ratio of Same Size Tubing Sections With and Without "LAPONITE ™ RD," with/without | Average of Extrusion Pressure Ratios of Same Size Tubing Sections, with/without |
|---|---|---|---|---|---|---|
| 1 | 0 | 4 | 0.125 | 755 | 3.73/1 | 4.48/1 |
| 2 | 3 | 4 | 0.125 | 2816 | | |
| 3 | 0 | 8 | 0.125 | 602 | 3.32/1 | |
| 4 | 3 | 8 | 0.125 | 1997 | | |
| 5 | 0 | 4 | 0.25 | 80 | 8.04/1 | |
| 6 | 3 | 4 | 0.25 | 643 | | |
| 7 | 0 | 8 | 0.25 | 216 | 2.84/1 | |
| 8 | 3 | 8 | 0.25 | 613 | | |

The results set forth in the TABLE show that the gellable water solutions that included 3% "LAPONITE™ RD" by volume of water have a much stronger resistance to flow through the tubing sections after gelling. On average, the extrusion pressure was increased by a factor of 4.48 when "LAPONITE™ RD" was added to the gellable solutions in an amount of 3% by volume of water prior to gelation. In a subterranean hydrocarbon reservoir, this would mean that a smaller amount of gellable solution would be required to withstand a particular differential pressure which would lead to cost savings. The thixotropic nature of the gellable solution before gelling would assure effective diversion of the fluid and uniform placement (avoid slumping) in natural fracture or gravel pack shut-off treatments. The smaller quantity of gellable solution required could also allow reperforating the shut-off zone when desirable.

Thus, the present invention is well adapted to carry out the objects and attain the ends and advantages mentioned as well as those which are inherent therein. While numerous changes can be made by those skilled in the art, such changes are encompassed within the spirit of this invention as defined by the appended claims.

What is claimed is:

1. A method of treating a subterranean zone penetrated by a well bore comprising introducing into said subterranean zone by way of said well bore an aqueous treating fluid consisting essentially of an aqueous liquid and one or more inorganic monovalent salts, multivalent salts or both in an amount no greater than about 5% by weight of said aqueous liquid, and one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$, a synthetic hectorite clay having the composition by weight on a dry basis of 54.5% $SiO_2$, 26.0% MgO, 0.8% $Li_2O$, 5.6% $Na_2O$ and 4.1% $P_2O_5$, and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers.

2. The method of claim 1 wherein the static temperature of the subterranean zone is in the range of from about ambient up to and including 400° F.

3. The method of claim 1 wherein said synthetic hectorite clay gelling and thixotropy imparting agent or agents are present in said aqueous treating fluid in an amount in the range of from about 0.1% to about 10% by weight thereof.

4. A method of treating a subterranean zone penetrated by a well bore comprising introducing into said subterranean zone by way of said well bore an aqueous treating fluid consisting essentially of an aqueous liquid and one or more inorganic monovalent salts, multivalent salts or both in an amount no greater than about 5% by weight of said aqueous liquid; one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$;

a synthetic hectorite clay having the composition by weight on a dry basis of 54.5% $SiO_2$, 26.0% MgO, 0.8% $Li_2O$, 5.6% $Na_2O$ and 4.1% $P_2O_5$ and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers; and a gelling agent in addition to said synthetic hectorite clay and thixotropy imparting agents.

5. The method of claim 4 wherein said additional gelling agent is a galactomannan selected from the group consisting of guar, hydroxypropylguar and carboxymethylhydroxypropylguar.

6. The method of claim 4 wherein said additional gelling agent is a cellulose derivative selected from the group consisting of hydroxyethylcellulose, carboxymethylhydroxyethylcellulose, carboxymethylcellulose and hydroxyethylcellulose grafted with vinyl phosphonic acid.

7. The method of claim 4 wherein said additional gelling agent is selected from the group consisting of xanthan, succinoglucan and scleroglucan biopolymers.

8. The method of claim 4 wherein said additional gelling agent is selected from the group consisting of:

water dispersible polyacrylamide and polymethacrylamide hydrophilic organic polymers having a molecular weight greater than 100,000 wherein about 5% to about 75% of the carboxamides are hydrolyzed to carboxyl groups, cellulose ethers, and a copolymer of about 5% to about 70% by weight acrylic acid or methacrylic acid copolymerized with acrylamide or methacrylamide.

9. The method of claim 8 wherein said water dispersible hydrophilic organic polymers are cross-linked with a cross-linking composition comprising water, a zirconium compound having a valence of 4+, an alpha-hydroxy acid and an amine compound.

10. The method of claim 4 wherein said additional gelling agent is:

a metal ion chelated with a water soluble polyalkylene imine, said polyalkylene imine being selected from the group consisting of polyethylene imine and polypropylene imine, and a water soluble polymer which is capable of being cross-linked by said chelated gelling agent, said water soluble polymer being selected from the group consisting of:
a terpolymer of an ethylenically unsaturated polar monomer, an ethylenically unsaturated ester and a monomer selected from the group consisting of 2-acrylamido-2-methyl propane sulfonic acid and N-vinylpyrrolidone, and
a tetrapolymer of an ethylenically unsaturated polar monomer, an ethylenically unsaturated ester, 2-acrylamido-2-methyl propane sulfonic acid and N-vinylpyrrolidone.

11. The method of claim 4 wherein said additional gelling agent is:

polymerizable water soluble monomers selected from the group consisting of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinylsulfonic acid, N-N-dimethylaminoethylmethacrylate, 2-triethylammoniumethylmethacrylate chloride, N,N-dimethylaminopropyl-methacrylamide, methacrylamidopropyl trimethylammonium chloride, N-vinyl pyrrolidone, vinyl phosphonic acid, and methacryloyloxyethyl trimethylammonium sulfate; and polymerization initiators selected from the group consisting of 2,2'-Azobis(N,N'-dimethylene isobutylamidine) dihydrochloride, 2,2'-Azobis(amidinopropane) dihydrochloride, and 2,2'-Azobis[2-methyl-N-(2-hydroxyethyl)propionamide].

12. The method of claim 11 wherein said additional gelling agent is cross-linked by a cross-linker selected from the group consisting of glycerol dimethacrylate, glycerol diacrylate and derivatives thereof.

13. The method of claim 4 wherein said additional gelling agent is present in said aqueous treating fluid in an amount in the range of from about 0.1% to about 20% by weight thereof.

14. A method of treating a subterranean zone penetrated by a well bore comprising introducing into said subterranean zone by way of said well bore an aqueous treating fluid consisting essentially of an aqueous liquid and one or more inorganic monovalent salts, multivalent salts or both in an amount no greater than about 5% by weight of said aqueous liquid; one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$;

a synthetic hectorite clay having the composition by weight on a dry basis of 54.5% $SiO_2$, 26.0% MgO, 0.8% $Li_2O$, 5.6% $Na_2O$ and 4.1% $P_2O_5$; and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers;

an additional gelling agent; and a cross-linking agent for cross-linking said additional gelling agent.

15. The method of claim 14 wherein said cross-linking agent is selected from the group consisting of borate releasing compounds, a source of titanium ions, a source of zirconium ions, a source of antimony ions and a source of aluminum ions.

16. The method of claim 14 wherein said cross-linking agent is present in said aqueous treating fluid in an amount in the range of from about 0.01% to about 5% by weight of said gelling agent therein.

17. A conformance control method of altering the permeability of a subterranean formation penetrated by a well bore comprising contacting the subterranean formation with an aqueous treating fluid consisting essentially of water; one or more inorganic monovalent salts, multivalent salts or both in an amount no greater than about 5% by weight of said water; and one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$, a synthetic hectorite clay having the composition by weight on a dry basis of 54.5% $SiO_2$, 26.0% MgO, 0.8% $Li_2O$, 5.6% $Na_2O$ and 4.1% $P_2O_5$, and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers.

18. The method of claim 17 wherein the static temperature of the subterranean zone is in the range of from about ambient up to and including 400° F.

19. The method of claim 17 wherein said synthetic hectorite clay gelling and thixotropy imparting agent or agents are present in said aqueous treating fluid in an amount in the range of from about 0.5% to about 5% by weight thereof.

20. A conformance control method of altering the permeability of a subterranean formation penetrated by a well bore comprising contacting the subterranean formation with an aqueous treating fluid consisting essentially of water; one or more inorganic monovalent salts, multivalent salts or both in an amount no greater than about 5% by weight of said water; one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$;

a synthetic hectorite clay having the composition by weight on a dry basis of 54.5% $SiO_2$, 26.0% MgO, 0.8% $Li_2O$, 5.6% $Na_2O$ and 4.1% $P_2O_5$; and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers; and a gelling agent in addition to said synthetic hectorite clay gelling and thixotropy imparting agents.

21. The method of claim 20 wherein said additional gelling agent is a galactomannan selected from the group consisting of guar, hydroxypropylguar and carboxymethylhydroxypropylguar.

22. The method of claim 20 wherein said additional gelling agent is a cellulose derivative selected from the group consisting of hydroxyethylcellulose, carboxymethylhydroxyethylcellulose, carboxymethylcellulose, and hydroxyethylcellulose grafted with vinyl phosphonic acid.

23. The method of claim 20 wherein said additional gelling agent is selected from the group consisting of xanthan, succinoglucan and scleroglucan biopolymers.

24. The method of claim 20 wherein said additional gelling agent is selected from the group consisting of:
water dispersible polyacrylamide and polymethacrylamide hydrophilic organic polymers having a molecular weight greater than 100,000 wherein about 5% to about 75% of the carboxamides are hydrolyzed to carboxyl groups,
cellulose ethers, and
a copolymer of about 5% to about 70% by weight acrylic acid or methacrylic acid copolymerized with acrylamide or methacrylamide.

25. The method of claim 24 wherein said water dispersible hydrophilic organic polymers are cross-linked with a cross-linking composition comprising water, a zirconium compound having a valence of 4+, an alpha-hydroxy acid and an amine compound.

26. The method of claim 20 wherein said additional gelling agent is:
a metal ion chelated with a water soluble polyalkylene imine, said polyalkylene imine being selected from the group consisting of polyethylene imine and polypropylene imine, and
a water soluble polymer capable of being cross-linked by said chelated gelling agent, said water soluble polymer being selected from the group consisting of:
a terpolymer of an ethylenically unsaturated polar monomer, an ethylenically unsaturated ester, and a monomer selected from the group consisting of 2-acrylamido-2-methyl propane sulfonic acid and N-vinylpyrrolidone, and
a tetrapolymer of an ethylenically unsaturated polar monomer, an ethylenically unsaturated ester, 2-acrylamido-2-methyl propane sulfonic acid and N-vinylpyrrolidone.

27. The method of claim 20 wherein said additional gelling agent is present in said aqueous treating fluid in an amount in the range of from about 2% to about 20% by weight thereof.

28. A conformance control method of altering the permeability of a subterranean formation penetrated by a well bore comprising contacting the subterranean formation with an aqueous treating fluid consisting essentially of water; one or more inorganic monovalent salts, multivalent salts or both in an amount no greater than about 5% by weight of said water; one or more synthetic hectorite clay gelling and thixotropy imparting agents selected from the group consisting of:
a synthetic hectorite clay having the composition by weight on a dry basis of 59.5% $SiO_2$, 27.5% MgO, 0.8% $Li_2O$ and 2.8% $Na_2O$,
a synthetic hectorite clay having the composition by weight on a dry basis of 54.5% $SiO_2$, 26.0% MgO, 0.8% $Li_2O$, 5.6% $Na_2O$ and 4.1% $P_2O_5$ and
synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers;
an additional gelling agent; and
a cross-linking agent for cross-linking said additional gelling agent.

29. The method of claim 28 wherein said cross-linking agent is selected from the group consisting of borate releasing compounds, a source of titanium ions, a source of zirconium ions, a source of antimony ions and a source of aluminum ions.

30. The method of claim 28 said cross-linking agent is present in said aqueous treating fluid in an amount in the range of from about 0.01% to about 5% by weight of said gelling agent therein.

31. A method of reducing undesirable well bore inflows and outflows from a subterranean zone penetrated by a well bore comprising placing an aqueous treating liquid in said subterranean zone, wherein said aqueous treating liquid consists essentially of water; one or more inorganic monovalent salts, multivalent salts or both in an amount no greater than about 5% by weight of said water; and one or more synthetic hectorite clay gelling and thixotropy imparting agents selected from the group consisting of:
a synthetic hectorite clay having the composition by weight on a dry basis of 59.5% $SiO_2$, 27.5% MgO, 0.8% $Li_2O$ and 2.8% $Na_2O$,
a synthetic hectorite clay having the composition by weight on a dry basis of 54.5% $SiO_2$, 26.0% MgO, 0.8% $Li_2O$, 5.6% $Na_2O$ and 4.1% $P_2O_5$, and
synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers.

32. The method of claim 31 the static temperature of the subterranean zone is in the range of from about ambient up to and including 400° F.

33. The method of claim 31 said synthetic hectorite clay gelling and thixotropy imparting agent or agents are present in said aqueous treating fluid in an amount in the range of from about 0.5% to about 5% by weight thereof.

34. A method of reducing undesirable well bore inflows and outflows from a subterranean zone penetrated by a well bore comprising placing an aqueous treating liquid in said subterranean zone, wherein said aqueous treating liquid consists essentially of water; one or more inorganic monovalent salts, multivalent salts or both in an amount no greater than about 5% by weight of said water; one or more synthetic hectorite clay gelling and thixotropy imparting agents selected from the group consisting of;
a synthetic hectorite clay having the composition by weight on a dry basis of 59.5% $SiO_2$, 27.5% MgO, 0.8% $Li_2O$ and 2.8% $Na_2O$;
a synthetic hectorite clay having the composition by weight on a dry basis of 54.5% $SiO_2$, 26.0% MgO, 0.8% $Li_2O$, 5.6% $Na_2O$ and 4.1% $P_2O_5$; and
synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers; and
a gelling agent in addition to said synthetic hectorite clay gelling and thixotropy imparting agents.

35. The method of claim 34 said additional gelling agent is a galactomannan selected from the group consisting of guar, bydroxypropylguar and carboxymethyihydroxypropylguar.

36. The method of claim 34 said additional gelling agent is a cellulose derivative selected from the group consisting of hydroxyethylcellulose, carboxymethylhydroxyethylcellulose, carboxymethylcellulose and hydroxyethylcellulose grafted with vinyl phosphonic acid.

37. The method of claim 34 said additional gelling agent is selected from the group consisting of xanthan, succinoglucan and scleroglucan biopolymers.

38. The method of claim 34 said additional gelling agent is:

polymerizable water soluble monomers selected from the group consisting of acrylic acid, methacrylic acid, acrylamide, methacrylamide, 2-methacrylamido-2-methyl propane sulfonic acid, 2-acrylamido-2-methyl propane sulfonic acid, N,N-dimethylacrylamide, vinylsulfonic acid, N-N-dimethylaminoethylmethacrylate, 2-triethylammoniumethylmethacrylate chloride, N,N-dimethylaminopropyl-methacrylamide, methacrylamidopropyl trimethylammonium chloride, N-vinyl pyrrolidone, vinyl phosphonic acid, and methacryloyloxyethyl trimethylammonium sulfate; and polymerization initiators selected from the group consisting of 2,2-Azobis(N,N'-dimethylene isobutylamidine) dihydrochloride, 2,2'-Azobis(amidinopropane) dihydrochloride, and 2,2'-Azobis[2-methyl-N-(2-hydroxyethyl)propionamide].

39. The method of claim 38 said gelling agent is cross-linked by a cross-linker selected from the group consisting of glycerol dimethacrylate, glycerol diacrylate and derivatives thereof.

40. The method of claim 34 said additional gelling agent is present in said aqueous treating fluid in an amount in the range of from about 0.1% to about 10% by weight thereof.

41. A method of reducing undesirable well bore inflows and outflows from a subterranean zone penetrated by a well bore comprising placing an aqueous treating liquid in said subterranean zone, wherein said aqueous treating liquid consists essentially of water; one or more inorganic monovalent salts, multivalent salts or both in an amount no greater than about 5% by weight of said water; one or more synthetic hectorite clay gelling and thixotropy imparting agents selected from the group consisting of:

a synthetic hectorite clay having the composition by weight on a dry basis of 59.5% $SiO_2$, 27.5% MgO, 0.8% $Li_2O$ and 2.8% $Na_2O$, a synthetic hectorite clay having the composition by weight on a dry basis of 54.5% $SiO_2$, 26.0% MgO, 0.8% $Li_2O$, 5.6% $Na_2O$ and 4.1% $P_2O_5$, and synthetic hectorite clay having the composition by weight on a dry basis of 54.5% $SiO_2$, 26.0% MgO, 0.8% $LiO_2$, 5.6% $Na_2O$, 4.1% $P_2O_5$ and also containing inorganic polyphosphate peptizers;

a gelling agent in addition to said synthetic hectorite clay gelling and thixotropy imparting agents; and a cross-linking agent for cross-linking said additional gelling agent therein.

42. The method of claim 41 said cross-linking agent is selected from the group consisting of borate releasing compounds, a source of titanium ions, a source of zirconium ions, a source of antimony ions and a source of aluminum ions.

43. The method of claim 41 said cross-linking agent is present in said aqueous treating fluid in an amount in the range of from about 0.01% to about 5% by weight of said gelling agent therein.

* * * * *